US012691884B2

(12) United States Patent
Takuma et al.

(10) Patent No.: US 12,691,884 B2
(45) Date of Patent: Jul. 28, 2026

(54) DRIVING FORCE CONTROL DEVICE AND VEHICLE

(71) Applicant: HITACHI ASTEMO, LTD., Hitachinaka (JP)

(72) Inventors: Hiroaki Takuma, Hitachinaka (JP); Takashi Okamoto, Hitachinaka (JP); Toshiyuki Innami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 77 days.

(21) Appl. No.: 18/702,961

(22) PCT Filed: Oct. 22, 2021

(86) PCT No.: PCT/JP2021/039120
§ 371 (c)(1),
(2) Date: Apr. 19, 2024

(87) PCT Pub. No.: WO2023/067802
PCT Pub. Date: Apr. 27, 2023

(65) Prior Publication Data
US 2024/0409100 A1     Dec. 12, 2024

(51) Int. Cl.
B60W 30/188          (2012.01)
B60W 40/06          (2012.01)

(52) U.S. Cl.
CPC .......... B60W 30/188 (2013.01); B60W 40/06 (2013.01); *B60W 2510/083* (2013.01); *B60W 2520/06* (2013.01)

(58) Field of Classification Search
CPC ............... B60W 30/188; B60W 40/06; B60W 2510/083; B60W 2520/06;
(Continued)

(56) References Cited

U.S. PATENT DOCUMENTS

| | | | |
|---|---|---|---|
| 7,739,005 B1 * | 6/2010 | Tang ......................... | B60L 3/10 |
| | | | 701/69 |
| 2004/0176899 A1 * | 9/2004 | Hallowell ........... | B60L 15/2036 |
| | | | 701/84 |

(Continued)

FOREIGN PATENT DOCUMENTS

| | | |
|---|---|---|
| JP | 2005-184911 A | 7/2005 |
| JP | 2016-199114 A | 12/2016 |

(Continued)

OTHER PUBLICATIONS

International Search Report with English Translation and Written Opinion in corresponding International Application No. PCT/JP2021/039120, dated Dec. 28, 2021.

*Primary Examiner* — Sze-Hon Kong
(74) *Attorney, Agent, or Firm* — Foley & Lardner LLP

(57)          ABSTRACT

A driving force control device for a vehicle having a driving unit capable of individually driving a left wheel and a right wheel, includes: a torque calculation unit for calculating a torque command value which is a torque to be generated in each of the left wheel and the right wheel; a traveling direction calculation unit for calculating a current traveling direction of the vehicle; a target traveling direction calculation unit for calculating a future target traveling direction of the vehicle by using at least one of information on a road surface on which the vehicle travels and external information of the vehicle, and; the torque calculation unit calculates a calculation command value so as to bring the current traveling direction close to the target traveling direction, and outputs the calculation command value to the driving unit as the torque command value.

8 Claims, 8 Drawing Sheets

(58) Field of Classification Search
CPC ....... B60W 2510/207; B60W 2540/18; B60W 2552/30; B60W 50/08; B60W 50/087; B60W 30/045; B60W 2720/406; B60L 9/18; Y02T 10/72
See application file for complete search history.

(56) References Cited

U.S. PATENT DOCUMENTS

| | | | | |
|---|---|---|---|---|
| 2006/0017414 | A1* | 1/2006 | Joe ........................ | B60W 20/00 |
| | | | | 318/432 |
| 2012/0179349 | A1* | 7/2012 | Yamakado .......... | B60W 30/045 |
| | | | | 701/89 |
| 2016/0214486 | A1* | 7/2016 | Suzuki .................... | B60L 50/52 |
| 2016/0297478 | A1 | 10/2016 | Inoue et al. | |
| 2017/0088174 | A1* | 3/2017 | Inoue ..................... | B62D 6/003 |
| 2018/0273026 | A1* | 9/2018 | Oyama ........... | B60W 30/18145 |
| 2018/0334053 | A1* | 11/2018 | Nasu ................... | B60L 15/2036 |
| 2020/0001889 | A1* | 1/2020 | Niu ........................ | B60W 10/20 |
| 2021/0139016 | A1* | 5/2021 | Horiguchi ......... | B60W 50/0097 |
| 2022/0227354 | A1* | 7/2022 | Hagiwara ............. | B60T 8/1755 |
| 2023/0068573 | A1* | 3/2023 | Tominaga ............ | B62D 5/0463 |

FOREIGN PATENT DOCUMENTS

| | | | |
|---|---|---|---|
| JP | 2017-065323 A | 4/2017 | |
| JP | 2018-167733 A | 11/2018 | |

* cited by examiner

DRIVING FORCE CONTROL DEVICE AND VEHICLE

TECHNICAL FIELD

The present invention relates to a driving force control device and a vehicle.

BACKGROUND ART

In control of a vehicle, a technique called torque vectoring is known in which different driving forces are applied to left and right driving wheels. Patent Document 1 discloses a motor input/output coefficient correction device for a wheel independent drive electric vehicle in which left and right wheels are independently driven by individual electric motors, and an input command value of each of the electric motors is determined from an output target value according to a predetermined motor input/output coefficient between the input command value and the output target value. The motor input/output coefficient correction device includes target traveling direction detection means for detecting a target traveling direction of the vehicle from a steering direction or the like input to steering means of the wheel independent drive electric vehicle, actual traveling direction detection means for detecting an actual traveling direction of the wheel independent drive electric vehicle, and motor input/output coefficient correction means for correcting the predetermined motor input/output coefficient so that the actual traveling direction approaches the target traveling direction on the basis of detection results by the target traveling direction detection means and the actual traveling direction detection means.

CITATION LIST

Patent Literature

Patent Document 1: JP-A-2005-184911

SUMMARY OF INVENTION

Technical Problem

In the invention described in Patent Document 1, steering is assumed, and there is room for improvement.

Solution to Problem

According to the 1st aspect of the present invention, a driving force control device for a vehicle having a driving unit capable of individually driving a left wheel and a right wheel, includes: a torque calculation unit for calculating a torque command value which is a torque to be generated in each of the left wheel and the right wheel; a traveling direction calculation unit for calculating a current traveling direction of the vehicle; a target traveling direction calculation unit for calculating a future target traveling direction of the vehicle by using at least one of information on a road surface on which the vehicle travels and external information of the vehicle, and; the torque calculation unit calculates a calculation command value so as to bring the current traveling direction close to the target traveling direction, and outputs the calculation command value to the driving unit as the torque command value.

According to the 2nd aspect of the present invention, a vehicle includes: a driving unit capable of individually driving a left wheel and a right wheel, and; a driving force control device for outputting a torque command value to the driving unit, the torque command value indicating a torque to be generated in each of the left wheel and the right wheel, wherein the driving force control device comprises: a torque calculation unit for calculating the torque command value; a traveling direction calculation for unit calculating a current traveling direction of the vehicle; a target traveling direction calculation unit for calculating a future target traveling direction of the vehicle by using at least one of information on a road surface on which the vehicle travels and external information of the vehicle, wherein the torque calculation unit calculates a calculation command value so that the current traveling direction close to the target traveling direction, and outputs the calculation command value to the driving unit as the torque command value.

Advantageous Effects of Invention

According to the present invention, the driving forces of the left and right wheels can be controlled based on information on the road surface and the outside world.

DESCRIPTION OF EMBODIMENTS

First Embodiment

Hereinafter, a first embodiment of a driving force control device will be described with reference to FIGS. 1 to 7.

Figure 1:
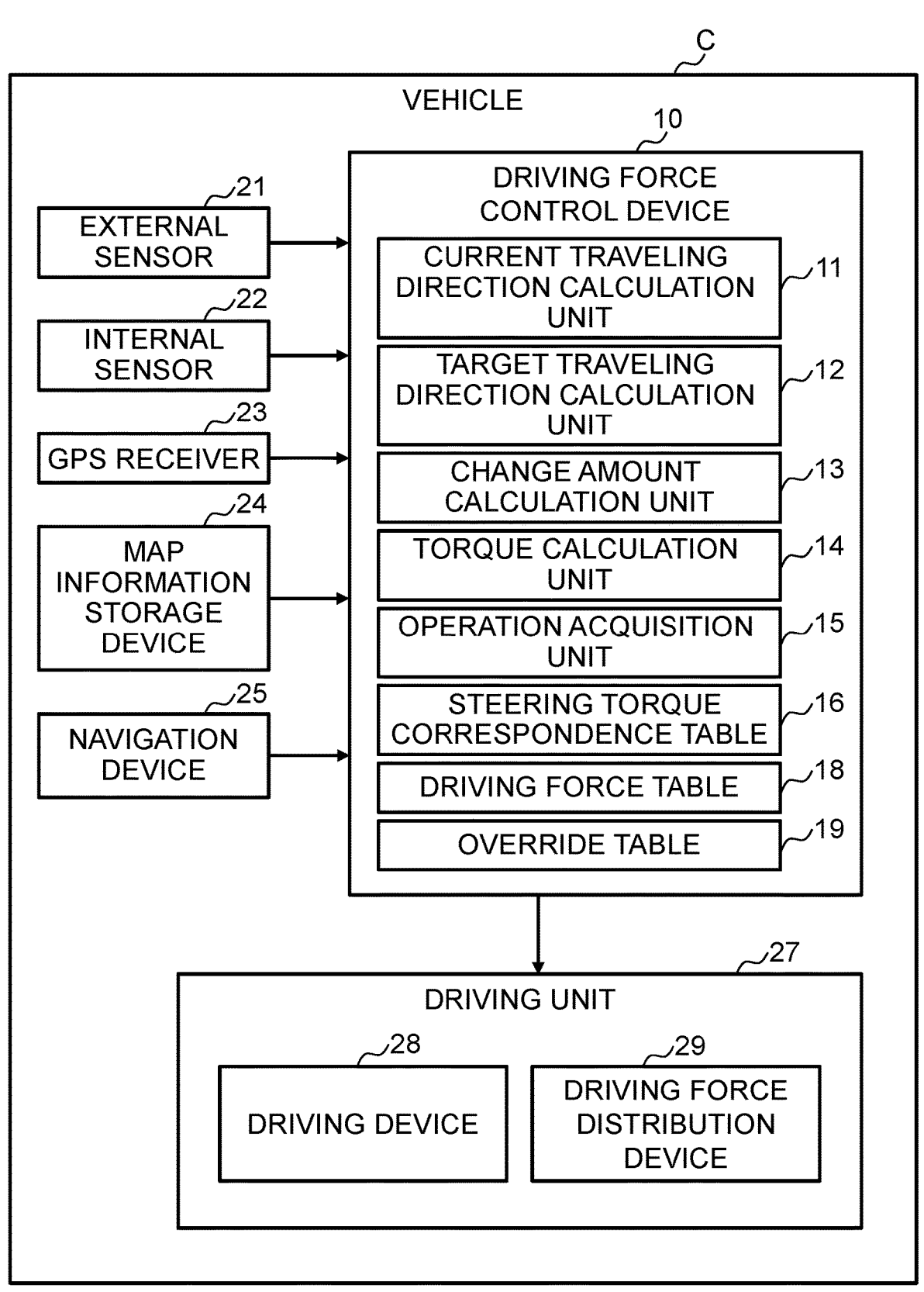
FIG. 1 is a block diagram of a vehicle according to a first embodiment.

FIG. 1 is a configuration diagram of a vehicle C including a driving force control device 10 according to a first embodiment. The vehicle C includes a driving force control device 10, an external sensor 21, an internal sensor 22, a GPS receiver 23, a map information storage device 24, a navigation device 25, and a driving unit 27. Hereinafter, a person who boards the vehicle C and operates the vehicle C is referred to as a "user". The driving force control device 10 outputs a torque command value to the driving unit 27. The torque command value is a collection of information on torque to be generated in each of the left wheel and the right wheel of the vehicle C. The driving force control device 10 includes, as its functions, a current traveling direction calculation unit 11, a target traveling direction calculation unit 12, a change amount calculation unit 13, a torque calculation unit 14, and an operation acquisition unit 15. The driving force control device 10 stores a steering torque correspondence table 16, a driving force table 18, and an override table 19.

The driving unit 27 includes a driving device 28 and a driving force distribution device 29. The driving device 28 is a power generation source that generates power for driving the vehicle C. The driving device 28 is, for example, an engine or a motor. The driving force distribution device 29 distributes the power generated by the driving device 28 to each of the left wheel and the right wheel of the vehicle C based on the torque command value output by the driving force control device 10. The driving force distribution device 29 is, for example, an electronically controllable differential gear.

The external sensor 21 is a sensor that senses the outside of the vehicle C. The external sensor 21 is, for example, a camera, a laser range finder, a light detection and ranging (LiDAR), or the like. The internal sensor 22 is a sensor that senses the inside of the vehicle C. The internal sensor 22 is, for example, a yaw rate sensor, a steering angle sensor, a depression amount sensor, or the like. The yaw rate sensor may be a gyro sensor capable of measuring a plurality of attitude angles including the yaw angle of the vehicle C. The steering angle sensor detects a steering angle of a steering wheel by a user. The depression amount sensor detects depression amounts of an accelerator pedal and a brake pedal by a user.

The GPS receiver 23 receives radio waves from a plurality of satellites constituting a satellite navigation system and analyzes signals included in the radio waves to calculate a position of the own vehicle, that is, latitude and longitude. The GPS receiver 23 outputs the calculated latitude and longitude to the driving force control device 10. The map information storage device 24 is a non-volatile storage device that stores map information including an area in which the vehicle C travels. The map information includes, for example, latitudes and longitudes of nodes that are ends of roads and intersections, information on detailed shapes of links connecting the nodes, and the like. The information on the detailed shape of the link includes the number of traveling lanes, the interval between the traveling lanes, the radius of curvature of the link, and auxiliary points indicating a plurality of latitudes and longitudes on the link. When the user inputs a destination, the navigation device 25 calculates a route to the destination and outputs the route to the driving force control device 10.

In the present embodiment, the yaw angle of the vehicle C, that is, the angle indicating the direction of north, south, east, and west is referred to as a "own vehicle angle $\theta$". The own vehicle angle $\theta$ is defined as, for example, an angle between the front direction of the vehicle C and the north, and takes a value of 0 degrees or more and less than 360 degrees. In the own vehicle angle $\theta$, the current value of the vehicle C is particularly referred to as a "current own vehicle angle $\theta n$", and the own vehicle angle $\theta$ of the vehicle C that should be present in the future is referred to as a "target own vehicle angle $\theta t$".

The operation acquisition unit 15 acquires operation information of the accelerator pedal or the steering wheel by the user. In other words, the operation acquisition unit 15 acquires information related to an operation input for the user to drive the vehicle C (hereinafter referred to as "operation information"). The operation information includes at least information on a steering angle.

The current traveling direction calculation unit 11 calculates the current own vehicle angle $\theta n$ using the outputs of the external sensor 21 and the internal sensor 22. The calculation of the current own vehicle angle $\theta n$ by the current traveling direction calculation unit 11 can use, for example, a plurality of methods described below. The current traveling direction calculation unit 11 can calculate the current own vehicle angle $\theta n$ by integrating the output of the yaw rate sensor included in the internal sensor 22. The current traveling direction unit 11 calculation can calculate the current own vehicle angle $\theta n$ by map matching or the like by combining the output of the external sensor 21 and the map information stored in the internal sensor 22. Further, the current traveling direction calculation unit 11 can calculate the current own vehicle angle $\theta n$ using the outputs of the GPS receiver 23 at different times.

The target traveling direction calculation unit 12 calculates the target own vehicle angle $\theta t$ using the outputs of the external sensor 21, the internal sensor 22, and the GPS receiver 23. In the calculation of the target own vehicle angle $\theta t$ by the target traveling direction calculation unit 12, the operation information, particularly, the information of the steering angle is not used. A specific method of calculating the target vehicle angle $\theta t$ is not particularly limited. For example, the target own vehicle angle $\theta t$ can be calculated as follows. The target traveling direction calculation unit 12 first specifies the future position of the vehicle C on the road based on the shape of the link on which the vehicle C is currently traveling, the current position of the vehicle C, the traveling direction of the vehicle C on the link, and the distance D. For example, it is assumed here that the vehicle C travels in the center of the travel lane. The "traveling direction on a link" here is information indicating whether the vehicle is traveling south or north on a link extending north-south, for example. Next, the target traveling direction calculation unit 12 calculates an appropriate own vehicle angle $\theta$ of the vehicle C at that position, and sets this as a target own vehicle angle $\theta t$. The appropriate own vehicle angle $\theta$ is an angle at which the center line of the vehicle C is parallel to the nearest lane marking forming the travel lane.

Figure 2:
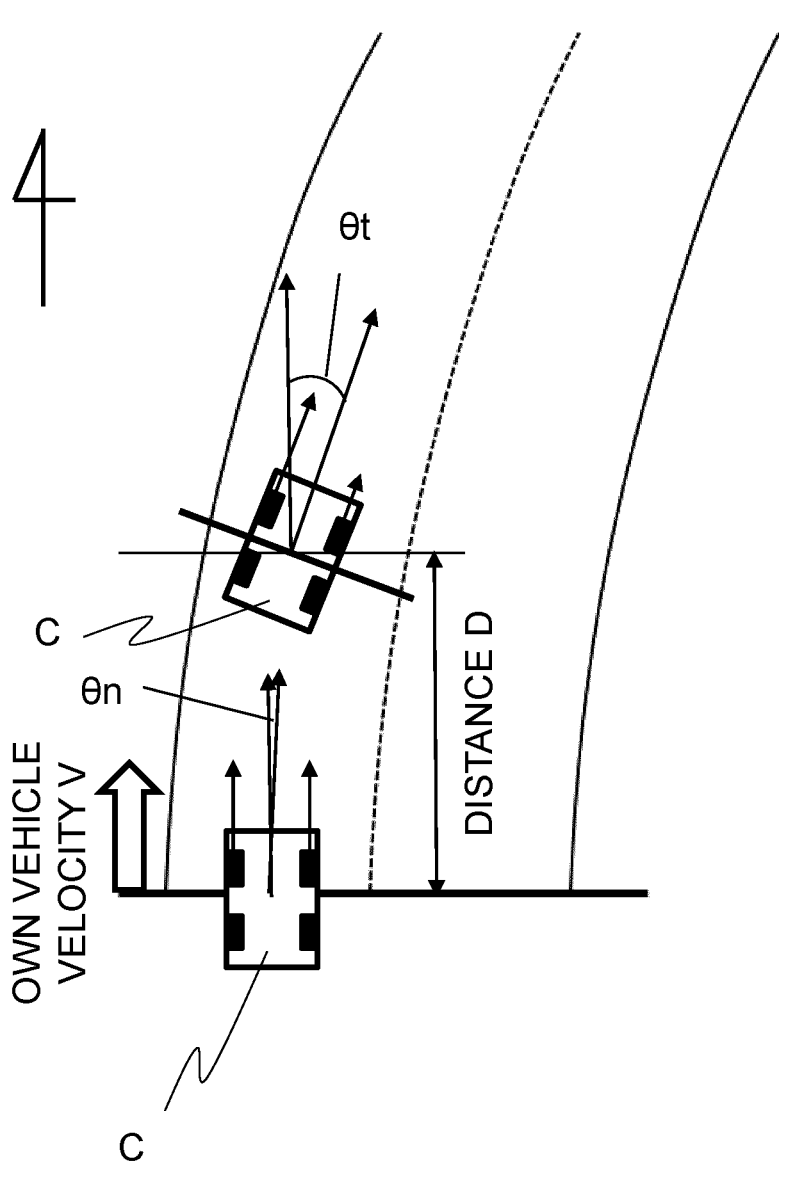
FIG. 2 is a diagram showing the definition of angles.

FIG. 2 is a diagram showing definitions of angles in the present embodiment. In FIG. 2, the upper side is north. Although two vehicles C are displayed in FIG. 2, the lower side indicates the current position and the upper side indicates the future position. The angle formed by the current traveling direction of the vehicle C and the north is the current own vehicle angle $\theta n$, and the angle formed by the future traveling direction of the vehicle C and the north is the target own vehicle angle $\theta t$.

The change amount calculation unit 13 calculates a target slip angle $\omega$ that is a difference between the target own vehicle angle $\theta t$ and the current own vehicle angle $\theta n$. For example, the target slip angle $\omega$ is defined as a value obtained by subtracting the current own vehicle angle $\theta n$ from the target own vehicle angle $\theta t$. When the target slip angle $\omega$ is a positive value, the torque of the left wheel of the vehicle C should be made larger than the torque of the right wheel.

The torque calculation unit 14 calculates a calculation command value and a user command value, and outputs one of them to the drive unit as a torque command value. The calculation command value is a torque command value calculated using the target traveling direction calculated by the target traveling direction calculation unit 12. If it is considered that the basis of the output by the torque calculation unit 14 is the calculation command value, it can be said that the torque calculation unit 14 determines whether or not to override the calculation command value with the user command value. However, when there is no operation of the steering wheel by the user, the torque calculation unit 14 determines that there is no override.

Each of the calculation command value and the user command value includes information on the torque command value of the right wheel and information on the torque command value of the left wheel. In the calculation command value and the user command value, the torque command value of the right wheel and the torque command value of the left wheel may be indicated as individual numerical values, may be indicated as a total value and a ratio of both, or may be indicated as a total value and a difference of both.

The torque calculation unit 14 refers to the driving force table 18 and the override table 19 in order to calculate the operation command value. The torque calculation unit 14 refers to the steering torque correspondence table 16 to calculate the user command value.

The driving force table 18 is a lookup table created in advance, and shows the correspondence between the target slip angle ω and the target left-right driving force difference Td. However, in the present embodiment, the driving force table 18 is merely described as a lookup table for convenience. That is, it is not essential that the driving force table 18 is represented in a tabular form, and the driving force table 18 may be represented in another form, for example, a mathematical expression. Therefore, the driving force table 18 can also be referred to as "correspondence information between the angle difference and the torque difference" indicating the correspondence between the target slip angle ω and the target left-right driving force difference Td.

Figure 3:
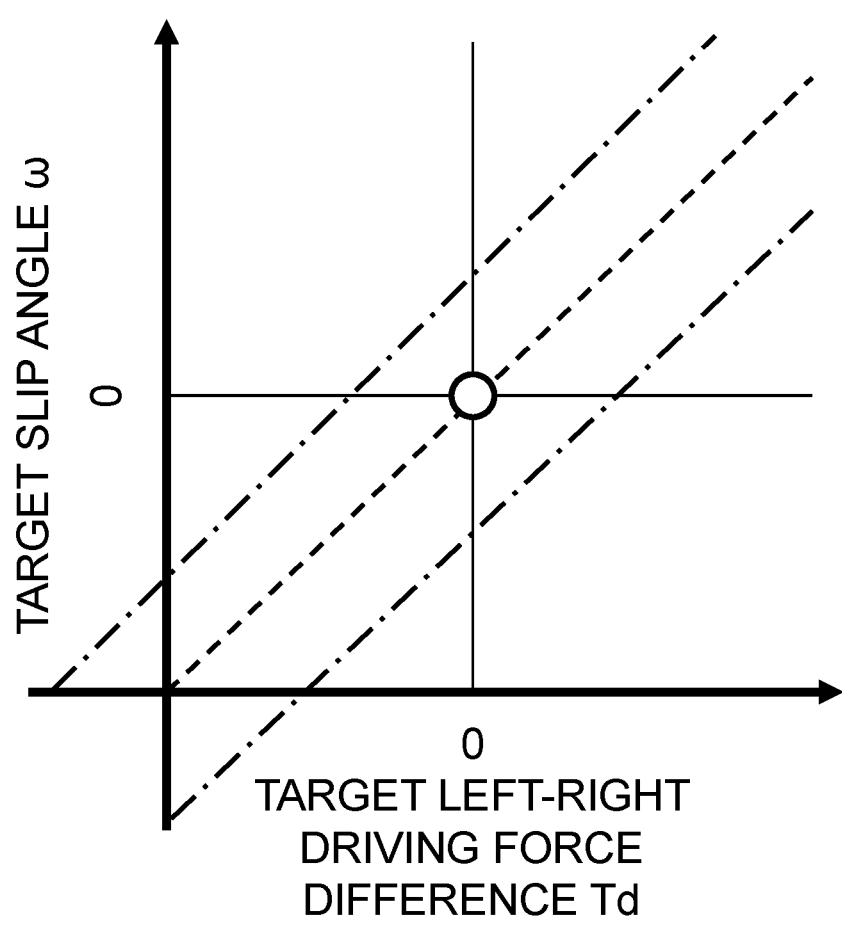
FIG. 3 is a diagram showing the concept of a driving force table.

FIG. 3 is a diagram showing the concept of the driving force table 18. FIG. 3 shows the correspondence between the target slip angle ω and the target left-right driving force difference Td. In the driving force table 18, the inclination of the road surface may be further taken into consideration. In this case, the correspondence between the target slip angle ω and the target left-right driving force difference Td is shifted as indicated by the one-dot chain line in FIG. 3. The target left-right driving force difference Td corresponding to the target slip angle ω is calculated in advance, for example, such that the yaw angle of the vehicle C changes by the same value as the target slip angle ω after one control cycle of the driving force control device 10.

The steering torque correspondence table 16 is a lookup table created in advance, and indicates the correspondence between the steering angle operated by the user and the user command value. In the steering torque correspondence table 16, for example, the target slip angle ω on the vertical axis in the driving force table 18 shown in FIG. 3 is replaced with a steering angle.

The override table 19 is a table that is appropriately created by the torque calculation unit 14, and is a table that is referred to in order to determine whether or not to override the calculation command value with the user command value. However, in the present embodiment, the override table 19 is merely described as a table for convenience. That is, it is not essential that the override table 19 is represented in a tabular form, and the override table 19 may be represented in another form, for example, a mathematical expression. Therefore, the override table 19 can also be referred to as "override determination information".

Figure 4:
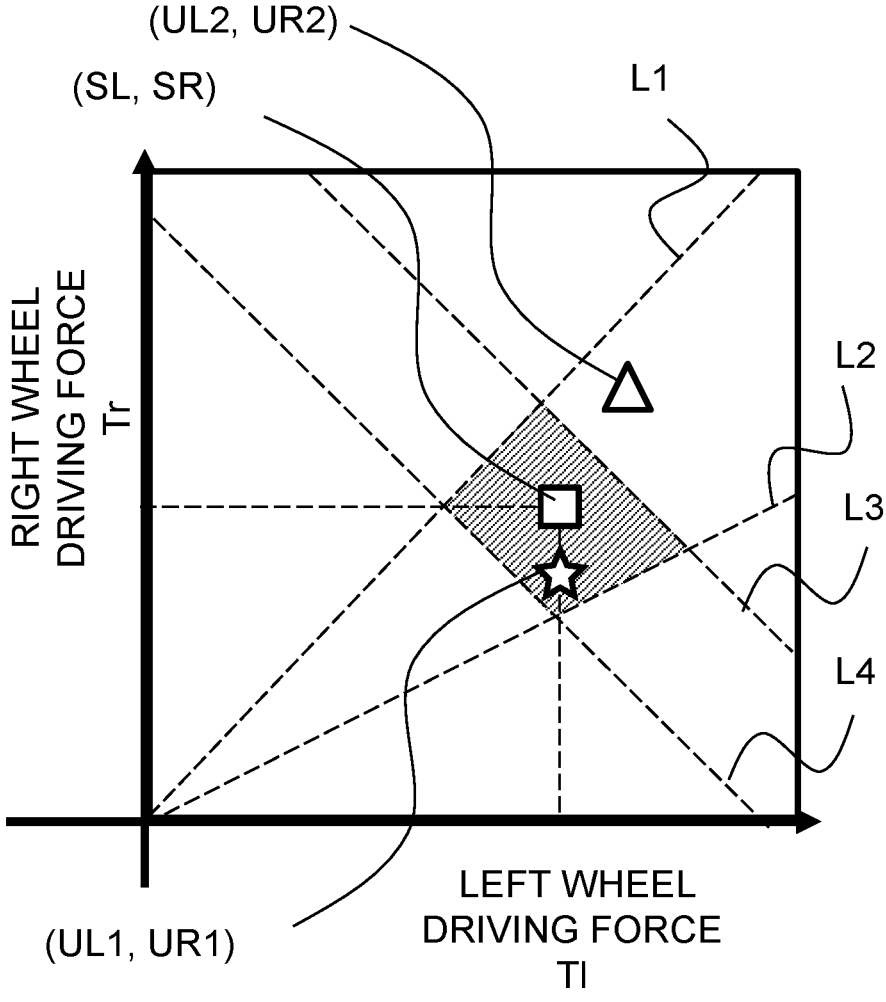
FIG. 4 is a diagram showing an example of an override table.

FIG. 4 is a diagram illustrating an example of the override table 19. In FIG. 4, two regions are shown with reference to the calculation command value calculated using the target traveling direction. The two regions include a first region indicated by hatching and a second region not indicated by hatching. The first region is an area in which the override is not performed, and the second region is an area in which the override is performed. The first region is a region surrounded by broken lines L1 to L4 described later. As described above, the calculation command value is a torque command value calculated using the target traveling direction, and the user command value is a torque command value calculated using the operation information by the user. Hereinafter, the torque command value of the right wheel included in the calculation command value is referred to as a calculation right wheel torque SR, and the torque command value of the left wheel included in the calculation command value is referred to as a calculation left wheel torque SL.

The torque command value of the right wheel included in the user command value is referred to as a user right wheel torque UR, and the torque command value of the left wheel included in the user command value is referred to as a user left wheel torque UL. A ratio between the calculated left wheel torque SL and the calculated right wheel torque SR, more accurately, an absolute value of a value obtained by dividing the calculated left wheel torque SL by the calculated right wheel torque SR is referred to as a calculated torque ratio Rs. A ratio between the user left wheel torque UL and the user right wheel torque UR, more accurately, an absolute value of a value obtained by dividing the user left wheel torque UL by the user right wheel torque UR is referred to as a user torque ratio Ru. In FIG. 4, the region between the broken line L1 and the broken line L2 is a region where the absolute value of the difference between the calculated torque ratio Rs and the user torque ratio Ru is smaller than the threshold a. In FIG. 4, the region between the broken line L3 and the broken line L4 is a region in which the absolute value of the difference between the sum of the calculated left wheel torque SL and the calculated right wheel torque SR and the sum of the user left wheel torque UL and the user right wheel torque UR is smaller than the threshold value β.

In FIG. 4, square markers indicate calculation command values. When the user command value is the value (UL1, UR1) indicated by the star marker, the torque calculation unit 14 outputs the calculation command value as the torque command value without overriding because the user command value is included in the first region. When the user command value is a value (UL2, UR2) indicated by a triangular marker, the torque calculation unit 14 overrides the user command value because the user command value is included in the second region, and outputs the user command value as the torque command value. In the present embodiment, the left and right wheels are steered based on the operation of the steering wheel by the user regardless of the presence or absence of the override.

Figure 5:
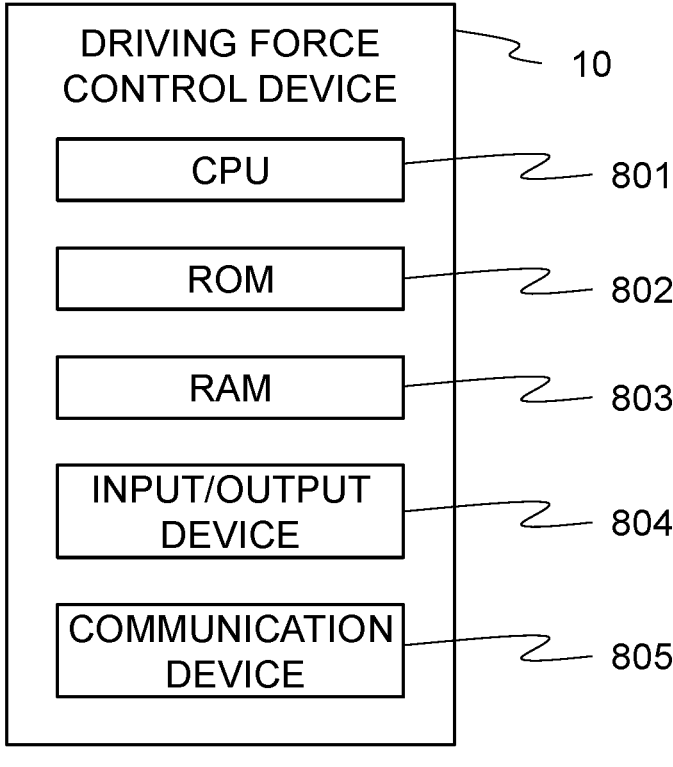
FIG. 5 is a hardware configuration diagram of the driving force control device.

FIG. 5 is a hardware configuration diagram of the driving force control device 10. The driving force control device 10 includes a central processing unit (CPU) 801, a read-only memory (ROM) 802, a random access memory (RAM) 803, and a communication device 805. The CPU801 loads a program stored in the ROM802 into the RAM803 and executes the program to perform the above-described various calculations. The driving force control device 10 may be realized by a field programmable gate array (FPGA), which is a rewritable logic circuit, or an application specific integrated circuit (ASIC), which is an application specific integrated circuit, instead of the combination of the CPU801, the ROM802, and the RAM803. Instead of the combination of the CPU801, the ROM802, and the RAM803, the driving force control device 10 may be realized by a combination of different configurations, for example, a combination of the CPU801, the ROM802, the RAM803, and an FPGA. The communication device 805 communicates with other devices mounted on the vehicle C. The communication device 805 supports a communication standard such as CAN (registered trademark) or IEEE802.3, for example.

Figure 6:
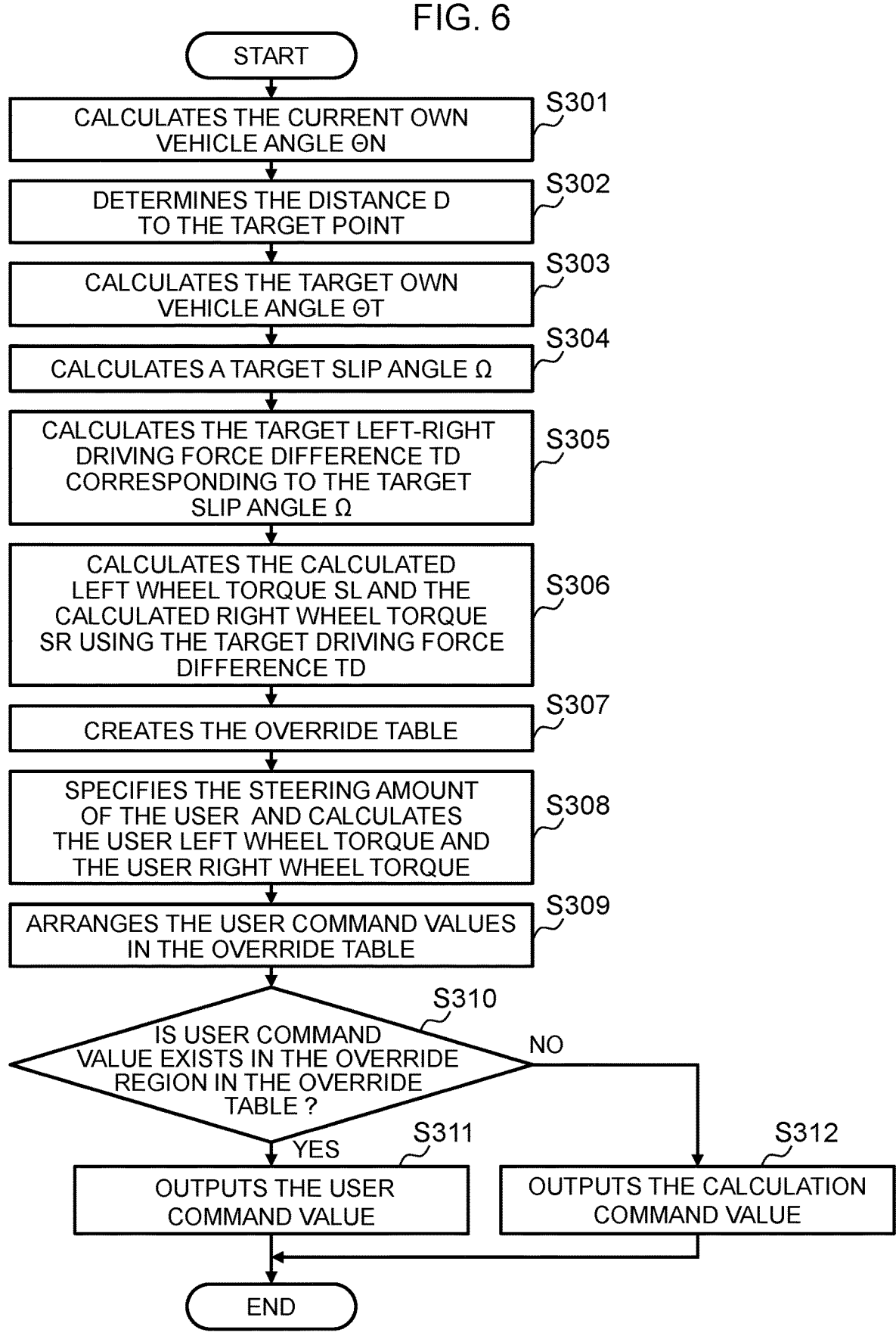
FIG. 6 is a flowchart showing a process performed by the driving force control device.

FIG. 6 is a flowchart illustrating processing of the driving force control device 10. In step S301, the current traveling direction calculation unit 11 calculates the current own vehicle angle θn. The current own vehicle angle θn may be calculated using the output of the internal sensor 22 or using the position information of the vehicle C output by the GPS receiver 23. In step S302, the target traveling direction calculation unit 12 determines the distance D to the target point. The distance D may be, for example, a distance traveled at the current speed of the vehicle C in a predetermined time, or may be a preset fixed value. The predetermined time may be a fixed time set in advance, for example, one second, or may be one control cycle of the driving force control device 10.

In step S303, the target traveling direction calculation unit 12 calculates the target own vehicle angle θt. The target traveling direction calculation unit 12 first specifies the future position of the vehicle C on the road based on the shape of the link on which the vehicle C is currently traveling, the current position of the vehicle C, the traveling direction of the vehicle C, and the distance D. Next, the target traveling direction calculation unit 12 calculates an appropriate own vehicle angle θ of the vehicle C at that position, and sets this as a target own vehicle angle θt. The appropriate own vehicle angle θ is an angle at which the center line of the vehicle C is parallel to the nearest lane marking. In step S304, the change amount calculation unit 13 calculates the target slip angle ω that is a difference between the target own vehicle angle θt and the current own vehicle angle θn.

In the following step S305, the torque calculation unit 14 calculates the target left-right driving force difference Td corresponding to the target slip angle ω. Specifically, the torque calculation unit 14 refers to the driving force table 18 and reads the target left-right driving force difference Td corresponding to the target slip angle ω. However, when it is determined that the link on which the vehicle C is traveling is inclined based on the information stored in the map information storage device 24, the torque calculation unit 14 changes the target left-right driving force difference Td to be read in accordance with the degree of the inclination. The target left-right driving force difference Td may be an integer value that is positive when the torque of the right wheel is larger than the torque of the left wheel. In this case, the target left-right driving force difference Td is expressed as "+10" or "−3". The target left-right driving force difference Td may be a combination of a sign for specifying the larger one and a numerical value indicating the difference in magnitude. In this case, the target left-right driving force difference Td is expressed as "R10" or "L3".

In subsequent step S306, the torque calculation unit 14 calculates the calculated left wheel torque SL and the calculated right wheel torque SR using the target driving force difference Td calculated in step S305. The total value of the torque command values of the left wheel and the right wheel is determined by, for example, the depression amount of the accelerator pedal by the user or the legal speed limit of the link on which the vehicle C is traveling. For example, when the target driving force difference Td is "R10" and the total value of the torque command values of the left and right wheels is "50 N·m", the torque command value of the right wheel is calculated as "30 N·m" and the torque command value of the left wheel is calculated as "20 N·m".

In subsequent step S307, the torque calculation unit 14 creates the override table 19. The override table 19 is created using the torque command value of the right wheel and the torque command value of the left wheel calculated in step S306. In subsequent step S308, the torque calculation unit 14 specifies the steering amount of the user included in the operation information, and calculates the user left wheel torque UL and the user right wheel torque UR with reference to the steering torque correspondence table 16. In subsequent step S309, the torque calculation unit 14 arranges the user command values calculated in step S308, that is, the user left wheel torque UL and the user right wheel torque UR in the override table 19 created in step S307.

In subsequent step S310, the torque calculation unit 14 determines whether or not the user command value exists in the override region in the override table 19, that is, the second region. The torque calculation unit 14 proceeds to step S311 when determining that the user command value is present in the override region, and proceeds to step S312 when determining that the user command value is not present in the override region. In step S311, the torque calculation unit 14 outputs the user command value as the torque command value, and ends the processing illustrated in FIG. 6. In step S312, the torque calculation unit 14 outputs the calculation command value as the torque command value, and ends the processing illustrated in FIG. 6.

Figure 7:
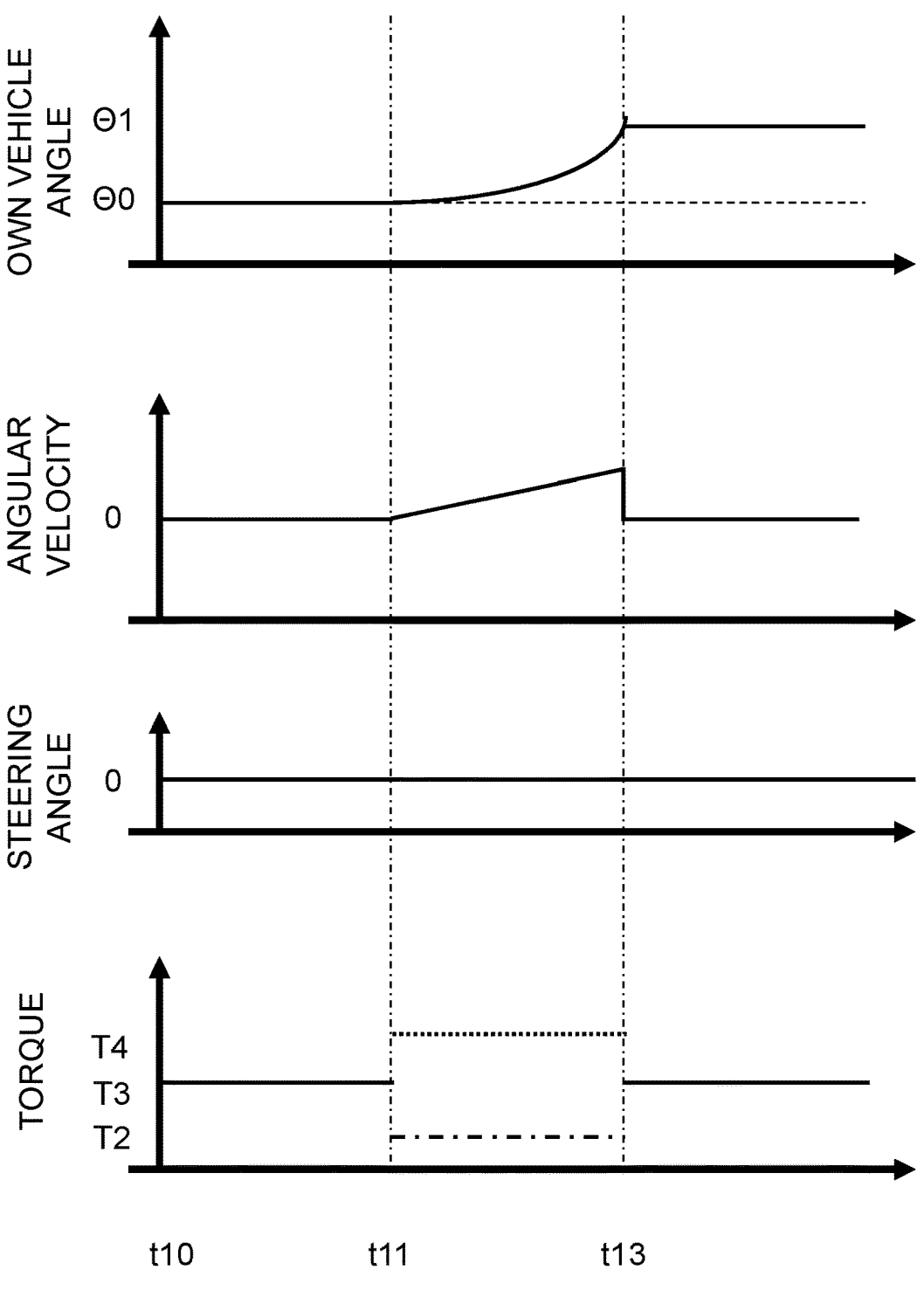
FIG. 7 is a time chart showing the operation of the driving force control device.

FIG. 7 is a time chart illustrating the operation of the driving force control device 10. In FIG. 7, the time becomes later toward the right side in the drawing. FIG. 7 illustrates temporal changes of the own vehicle angle, the angular velocity, the steering angle, and the torque from the top. The steering angle is always zero in the range shown in FIG. 7. That is, the user is not operating the steering wheel. At time t10, the vehicle C is traveling straight, and the current own vehicle angle θn is "θ0". At time t10, the target traveling direction calculation unit 12 calculates that the target own vehicle angle θt remains "θ0" and does not change, and both the calculated left wheel torque SL and the calculated right wheel torque SR are set to "T3".

At time t11, the target traveling direction calculation unit 12 calculates the target own vehicle angle θt at time t13 as "θ1" from the information of the road surface on which the vehicle C travels. Then, the torque calculation unit 14 specifies the target left-right driving force difference Td corresponding to "θ1−θ0", which is the target slip angle, with reference to the driving force table 18, and calculates the calculated left wheel torque SL and the calculated right wheel torque SR using the sum of torques determined from the legal speed limit or the like in the link on which the vehicle C travels. In the example shown in FIG. 7, the calculated left wheel torque SL is calculated as "T4", and the calculated right wheel torque SR is calculated as "T2". When the torque calculation unit 14 outputs the torque command value to the driving unit 27, the own vehicle angle and the angular velocity of the vehicle C gradually increase.

At time t13, the change amount calculation unit 13 calculates the future target own vehicle angle θt to be "θ1", that is, the same value as the value calculated at time t11. Since the target slip angle is zero and thus the target left-right driving force difference Td is zero, the torque calculation unit 14 sets the calculated left wheel torque SL and the calculated right wheel torque SR to "T3". As a result, the angular velocity of the vehicle C becomes zero, and the own vehicle angle remains "θ1". This completes the description of FIG. 7.

According to the first embodiment described above, the following effects can be obtained. (1) The driving force control device 10 is mounted in a vehicle C including a driving unit 27 capable of individually driving a left wheel and a right wheel. The driving force control device 10 includes the torque calculation unit 14 that individually calculates a calculated torque target value that is a torque to be generated in each of the left wheel and the right wheel, the current traveling direction calculation unit 11 that calculates a current traveling direction of the vehicle C, and the target traveling direction calculation unit 12 that calculates the future target traveling direction of the vehicle C using at least one of information on a road surface on which the vehicle C travels and external environment information of the vehicle. The torque calculation unit 14 calculates the calculated torque target value such that the current traveling direction approaches the target traveling direction. Therefore, the torque of the left and right wheels can be controlled regardless of the operation of the steering angle by the user.

(2) The driving unit 27 includes one driving device 28 and a driving force distribution device 29 capable of distributing the output of the electric motor to the left wheel and the right wheel. Therefore, the present invention can be implemented in the vehicle C including one driving device 28.

(3) The torque calculation unit 14 calculates the calculated torque command value so that the current traveling direction becomes the target traveling direction. Therefore, the traveling direction of the vehicle C can be matched with the target traveling direction.

(4) The driving force control device 10 includes an operation acquisition unit 15 that acquires operation information that is information regarding an operation input for a user to drive a vehicle and includes at least information regarding a steering angle. The torque calculation unit 14 determines whether or not to override the calculation command value with the user command value based on a deviation between the user command value that is the torque target value based on the operation information and the calculation command value that is the torque command value based on the target traveling direction. Therefore, it is possible to realize the control of the vehicle C in which user operation is prioritized.

Modification 1

The vehicle C may not accept the driving operation by the user. That is, the vehicle C may be a vehicle that performs only automated driving. In this case, the driving force control device 10 may not include the operation acquisition unit 15, and the torque calculation unit 14 always outputs the calculation command value without determining the override. That is, the driving force control device 10 can omit the processing after step S307 in FIG. 6, and outputs the torque command value calculated in step S306.

Modification 2

The order of steps S303 and S302 in FIG. 6 may be changed, and the estimation of the target own vehicle angle θt may be executed after step S301, and then the determination of the distance D to the target point may be performed. In this case, for example, based on the shape of the link on which the vehicle C is currently traveling and the current position of the vehicle C, the closest position at which the own vehicle angle θ of the vehicle C traveling along the road changes from the current own vehicle angle θn by a predetermined angle or more is specified.

Modification 3

In the first embodiment described above, the torque calculation unit 14 overrides the calculation command value with the user command value in the following two cases. That is, the first case is a case where the absolute value of the difference between the calculated torque ratio Rs and the user torque ratio Ru is larger than the threshold value α. The second case is a case where the absolute value of the difference between the sum of the calculated left wheel torque SL and the calculated right wheel torque SR and the sum of the user left wheel torque UL and the user right wheel torque UR is larger than the threshold value β. However, only one of the cases may be overridden, or the difference may be evaluated instead of the ratio. Evaluating the difference instead of the ratio is to evaluate whether or not the absolute value of the difference between the difference between the calculated left wheel torque SL and the calculated right wheel torque SR and the difference between the user left wheel torque UL and the user right wheel torque UR is larger than the threshold value γ.

According to the present modification, the following effects can be obtained.

(5) The torque calculation unit 14 evaluates the deviation between the ratio between the right wheel torque and the left wheel torque in the user command value and the ratio between the right wheel torque and the left wheel torque in the calculation command value to determine the presence or absence of the override.

(6) The torque calculation unit 14 evaluates the difference between the difference between the right wheel torque and the left wheel torque in the user command value and the difference between the right wheel torque and the left wheel torque in the calculation command value to determine the presence or absence of the override.

Modification 4

The target slip angle ω may be simply calculated by using the radius of curvature of the link on which the vehicle C travels and the distance D. For example, when the radius of curvature of the link on which the vehicle C travels is "r" and the distance D calculated in step S302 is "d", the target slip angle ω [deg] is calculated as 360*d/(2*π*r).

Modification 5

In the first embodiment described above, the torque command value calculated by the torque calculation unit 14 is a certain constant value, and is set to the constant value until calculation is performed again. For example, in FIG. 7, the torque command value is changed at time t11 and time t13, but there is no change at other times. Therefore, the angular velocity changed linearly, and the own vehicle angle θ changed quadratically. However, the torque command value does not have to be a constant value. For example, the torque calculation unit 14 may control the torque so that the amount of temporal change in the own vehicle angle is constant, that is, the angular velocity is constant.

Modification 6

The torque calculation unit 14 may set the value of the target left-right driving force difference Td by determining whether the target slip angle ω is positive, zero, or negative, instead of the value of the target slip angle ω itself. In this case, the value of the target left-right driving force difference Td is, for example, one of "+D", "0", and "−D". That is, the torque calculation unit 14 may simply determine the value of the target left-right driving force difference Td so that the current traveling direction approaches the target traveling direction as much as possible.

Second Embodiment

A second embodiment of the driving force control device will be described with reference to FIG. 8. In the following description, the same components as those of the first embodiment are denoted by the same reference numerals, and differences will be mainly described. Points not particularly described are the same as those in the first embodiment. The present embodiment is different from the first embodiment mainly in that the vehicle includes a plurality of driving devices.

Figure 8:
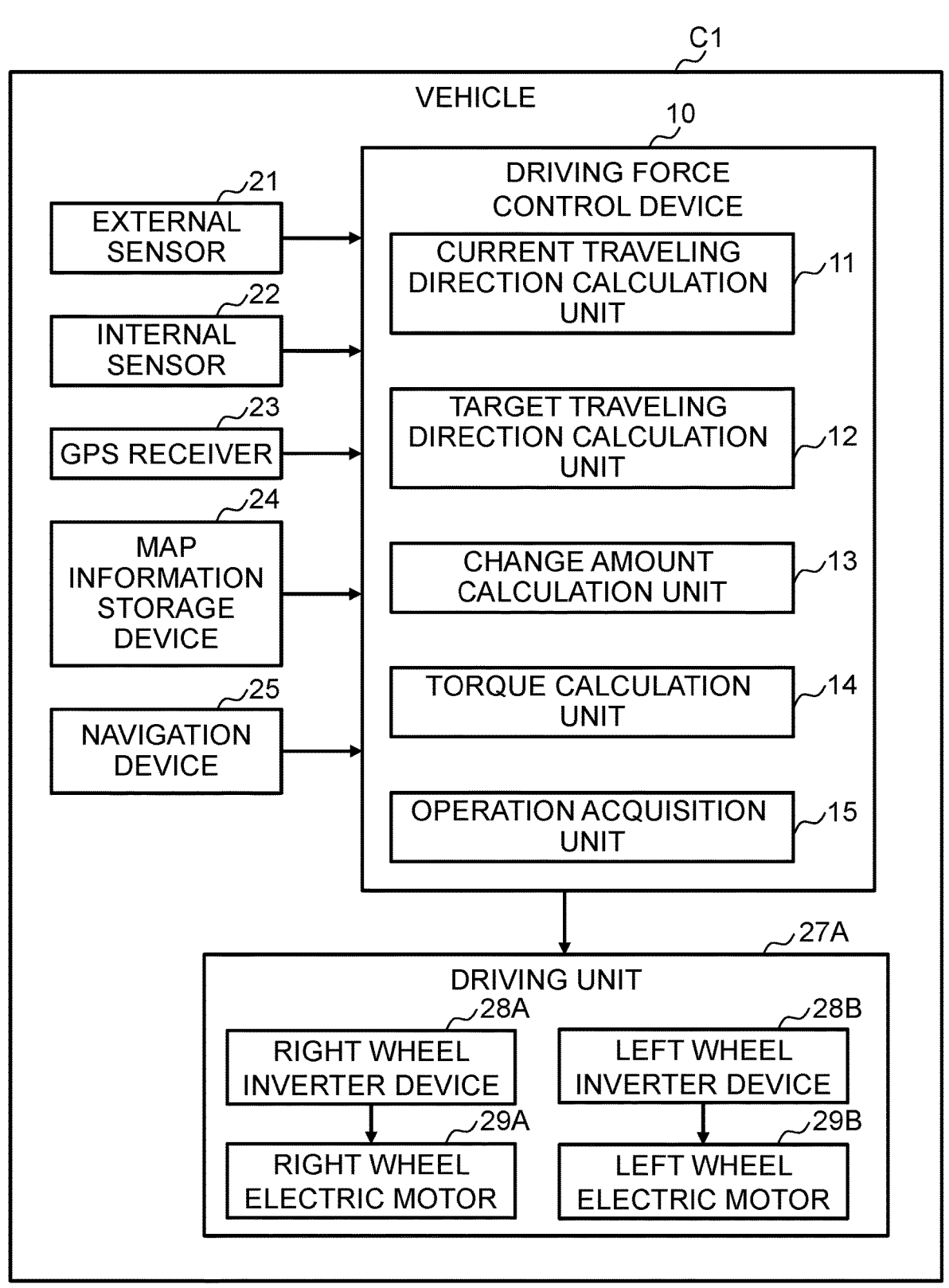
FIG. 8 is a block diagram of a vehicle according to a second embodiment.

FIG. 8 is a block diagram of a vehicle C1 including the driving force control device 10 according to the second embodiment. The vehicle C1 includes a driving unit 27A instead of the driving unit 27 in the first embodiment. The driving unit 27A includes a right wheel inverter device 28A, a right wheel electric motor 29A, a left wheel inverter device 28B, and a left wheel electric motor 29B. The driving unit 27A operates based on the torque command value output by the driving force control device 10. The right wheel electric motor 29A and the left wheel electric motor 29B are, for example, in-wheel motors. The right wheel inverter device 28A supplies electric power to the right wheel electric motor 29A based on the torque command value of the right wheel included in the torque command value. The left wheel inverter device 28B supplies electric power to the left wheel electric motor 29B based on the torque command value of the left wheel included in the torque command value.

Since the configuration of the driving force control device 10 is the same as that of the first embodiment, the description thereof will be omitted. That is, the present embodiment is different from the first embodiment in the configuration for driving the vehicle C1.

According to the second embodiment described above, the following effects can be obtained. (7) The driving unit 27A includes the left wheel electric motor 29B that drives the left wheel and the right wheel electric motor 29A that drives the right wheel and is different from the left wheel electric motor 29B. Therefore, the present invention can be implemented in the vehicle C1 including the electric motors that drive the left and right wheels, respectively.

In each of the above-described embodiments and modifications, the configuration of the functional block is merely an example. Some functional configurations illustrated as separate functional blocks may be integrally configured, or a configuration represented by one functional block diagram may be divided into two or more functions. Further, a part of the functions of each functional block may be included in another functional block.

In the above-described embodiments and modifications, the program is stored in the ROM802. However, the program may be stored in a nonvolatile memory (not shown). Further, the driving force control device 10 may include an input/output interface (not illustrated), and the program may be read from another device via the input/output interface and a medium that can be used by the driving force control device 10 when necessary. Here, the medium refers to, for example, a storage medium that can be attached to and detached from the input/output interface, or a communication medium, that is, a wired, wireless, or optical network, or a carrier wave or a digital signal that propagates through the network. Some or all of the functions implemented by the program may be implemented by a hardware circuit or an FPGA.

The above-described embodiments and modifications may be combined with each other. Although various embodiments and modifications have been described above, the present invention is not limited to these contents. Other embodiments conceivable within the scope of the technical idea of the present invention are also included in the scope of the present invention.

REFERENCE SIGNS LIST

10 . . . Driving force control device
11 . . . Current traveling direction calculation unit
12 . . . Target traveling direction calculation unit
14 . . . Torque Calculation
15 . . . Operation Acquisition
27, 27A . . . Driver
28 . . . Drive
28A . . . Right wheel inverter
28B . . . Left wheel inverter
29 . . . Driving force distribution
29A . . . Right wheel electric motor
29B . . . Left wheel electric motor

The invention claimed is:

1. A driving force control device for a vehicle having a driving unit capable of individually driving a left wheel and a right wheel, comprising:
   a central processing unit (CPU) configured to:
   calculate a torque command value which is a torque to be generated in each of the left wheel and the right wheel;
   calculate a current traveling direction of the vehicle;
   calculate a future target traveling direction of the vehicle by using at least one of information on a road surface on which the vehicle travels and external information of the vehicle, and;
   calculate a calculation command value so as to bring the current traveling direction close to the target traveling direction, and outputs the calculation command value to the driving unit as the torque command value; and
   acquire operation information that is information relating to an operation input for a user to drive the vehicle and includes at least information relating to a steering angle,
   wherein the CPU is further configured to determine whether or not to override the calculation command value with user command value which is the torque command value based on the operation information based on a deviation between the user command value and the calculation command value that is the torque command value based on the target traveling direction,
   wherein the CPU is further configured to evaluate a deviation between a ratio between the right wheel torque and the left wheel torque in the user command value and a ratio between the right wheel torque and the left wheel torque in the calculation command value.

2. The driving force control device according to claim 1, wherein the driving unit includes at least one driving device and a differential device capable of distributing an output of the driving device to the left wheel and the right wheel.

3. The driving force control device according to claim 1, wherein the driving unit includes a left wheel electric motor that drives the left wheel and a right wheel electric motor that drives the right wheel and is different from the left wheel electric motor.

4. The driving force control device according to claim 1, further comprising:

wherein the CPU is further configured to calculate the calculation command value so that the current traveling direction becomes the target traveling direction.

5. A driving force control device for a vehicle having a driving unit capable of individually driving a left wheel and a right wheel, comprising:

a central processing unit (CPU) configured to:

calculate a torque command value which is a torque to be generated in each of the left wheel and the right wheel;

calculate a current traveling direction of the vehicle;

calculate a future target traveling direction of the vehicle by using at least one of information on a road surface on which the vehicle travels and external information of the vehicle, calculate a calculation command value so as to bring the current traveling direction close to the target traveling direction, and outputs the calculation command value to the driving unit as the torque command value; and acquire operation information that is information relating to an operation input for a user to drive the vehicle and includes at least information relating to a steering angle, wherein the CPU is further configured to determine whether or not to override the calculation command value with user command value which is the torque command value based on the operation information based on a deviation between the user command value and the calculation command value that is the torque command value based on the target traveling direction, wherein the CPU is further configured to evaluate a deviation between a ratio between the right wheel torque and the left wheel torque in the user command value and a ratio between the right wheel torque and the left wheel torque in the calculation command value, and wherein the torque calculation unit evaluates a difference between the right wheel torque and the left wheel torque in the user command value and a difference between the right wheel torque and the left wheel torque in the calculation command value.

6. A vehicle comprising:

a driving unit capable of individually driving a left wheel and a right wheel, and;

a driving force control device for outputting a torque command value to the driving unit, the torque command value indicating a torque to be generated in each of the left wheel and the right wheel, wherein the driving force control device comprises:

a central processing unit (CPU) configured to:

calculate the torque command value;

calculate a current traveling direction of the vehicle;

calculate a future target traveling direction of the vehicle by using at least one of information on a road surface on which the vehicle travels and external information of the vehicle, wherein the CPU is further configured to calculate a calculation command value so that the current traveling direction close to the target traveling direction, and outputs the calculation command value to the driving unit as the torque command value acquire operation information that is information relating to an operation input for a user to drive the vehicle and includes at least information relating to a steering angle, wherein the CPU is further configured to determine whether or not to override the calculation command value with user command value which is the torque command value based on the operation information based on a deviation between the user command value and the calculation command value that is the torque command value based on the target traveling direction, wherein the CPU is further configured to evaluate a deviation between a ratio between the right wheel torque and the left wheel torque in the user command value and a ratio between the right wheel torque and the left wheel torque in the calculation command value.

7. The vehicle according to claim 6, wherein the driving unit includes at least one driving device and a differential device capable of distributing an output of the driving device to the left wheel and the right wheel.

8. The vehicle according to claim 6, wherein a left wheel electric motor that drives the left wheel; and a right wheel electric motor that drives the right wheel and is different from the left wheel electric motor.

* * * * *